May 15, 1956 L. B. WOOLAVER ET AL 2,746,019

DELAY LINE

Filed Sept. 19, 1951 2 Sheets-Sheet 1

INVENTORS
LAWRENCE B. WOOLAVER
FRANKLYN P. MACLAY

BY Kenway, Jenney, Witter + Hildreth,
ATTORNEYS

INVENTORS
LAWRENCE B. WOOLAVER
FRANKLYN P. MACLAY
BY Kenway, Jenney, Witter & Hildreth,
ATTORNEYS

United States Patent Office 2,746,019

Patented May 15, 1956

2,746,019

DELAY LINE

Lawrence B. Woolaver, Boston, and Franklyn P. Maclay, Natick, Mass., assignors to Laboratory for Electronics, Inc., Boston, Mass., a corporation of Delaware Application September 19, 1951, Serial No. 247,332

11 Claims. (Cl. 333—30)

Figure 1:
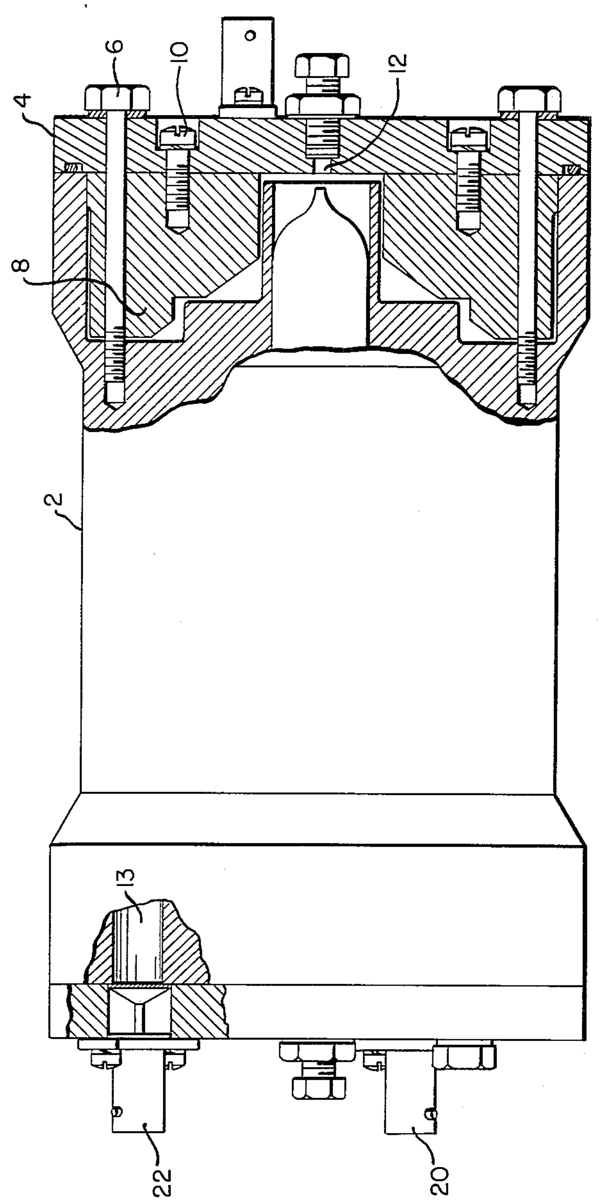

The present invention relates to delay lines and more particularly to improvements in sonic delay lines in which the delay is represented by the time necessary for propagation of a sound wave through a liquid.

In a patent to Star, No. 2,558,012, there is disclosed a sonic delay line comprising a liquid-filled chamber, two corner reflectors, one at each end of the chamber, each reflector having two mutually perpendicular plane reflecting surfaces intersecting in an axis, and a pair of electro-acoustical transducers, one to convert electrical to sonic energy and the other to convert sonic energy to electrical energy. One of the features of this delay line is the provision for changing the delay by adjusting one of the corner reflectors with respect to the other. The chamber between the corner reflectors is solidly filled with mercury, thus providing for the transmission of a sonic beam parallel to the axis of the delay line from any point on the surface of either reflector.

One of the chief objects of the present invention is to provide an improved form of delay line of the general type described in the above-mentioned patent, the characteristics of the improved line including the substantial reduction or elimination of spurious reflections of the sonic beam. These reflections produce undesired actuations of the receiving transducer. The phenomenon of spurious reflections is a function of the quantity of energy which is required to transmit the sonic beam. This quantity is in turn related to the diameter of the beam which may be conveniently produced at the desired energy level. It has been found in practice that the sonic beam should have a diameter which is appreciable in comparison with the diameter of the chamber itself. If the diameter of the chamber is increased, thus causing a reduction in spurious reflections for a beam of given diameter by allowing for the separation of the elements of the beam from one another, the resulting increase in the bulk and weight of the apparatus becomes prohibitive. Since the chamber is ordinarily filled with mercury, the importance of this consideration will be easily understood.

Another object of the invention is to provide two or more equal and simultaneously available delay paths. As it is well known to those familiar with the electronic art, it is frequently necessary or desirable to provide means for establishing two independent delay circuits, in which case it is usually extremely important that the equality of the delays be assured. It is also well known that one of the main factors affecting the speed of a sonic pulse through mercury is the temperature of the mercury. If two delay lines of the type described in the above-mentioned patent are employed, there arises a problem of providing means to assure the equality of the temperatures of the mercury in each of the lines. There also arises a problem of calibrating one of the delay lines against the other to eliminate any variations in the dimensions of their respective parts.

Another object of the invention is to reduce the weight of the delay line assembly, largely by reducing the required volume of mercury, thus greatly reducing the expense of manufacture.

With the above objects in view one feature of the present invention includes a non-spurious delay line having provision for one or more equal and simultaneously available delays.

Another feature is the provision for one or more delay paths wherein the paths are concentrically arranged, with the inner path having longer longitudinal components than the outer path, the resulting increase in path lengths being compensated for by the reduction in the length of the end reflection paths, so that the aggregate lengths of each of the paths in the delay line are the same for any particular setting of the corner reflectors.

Another feature of the invention includes the elimination of spurious reflections both between segments of the same delay path and between different delay paths.

Other features and objects of the invention include certain novel constructions, combinations and arrangements hereinafter described and particularly defined by the claims.

Figure 2:
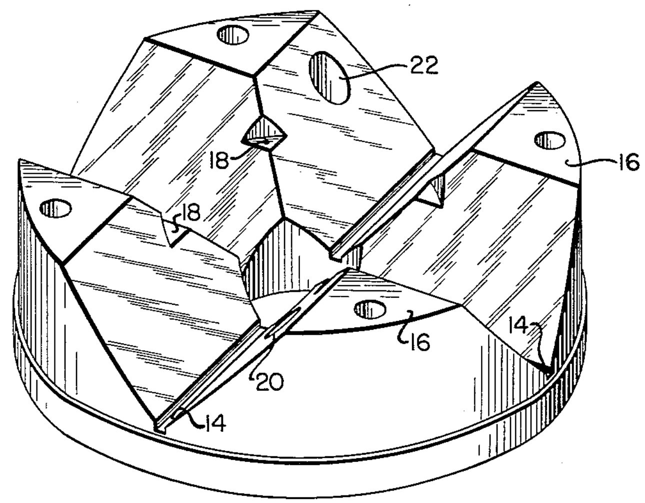
Figures 3, 4:
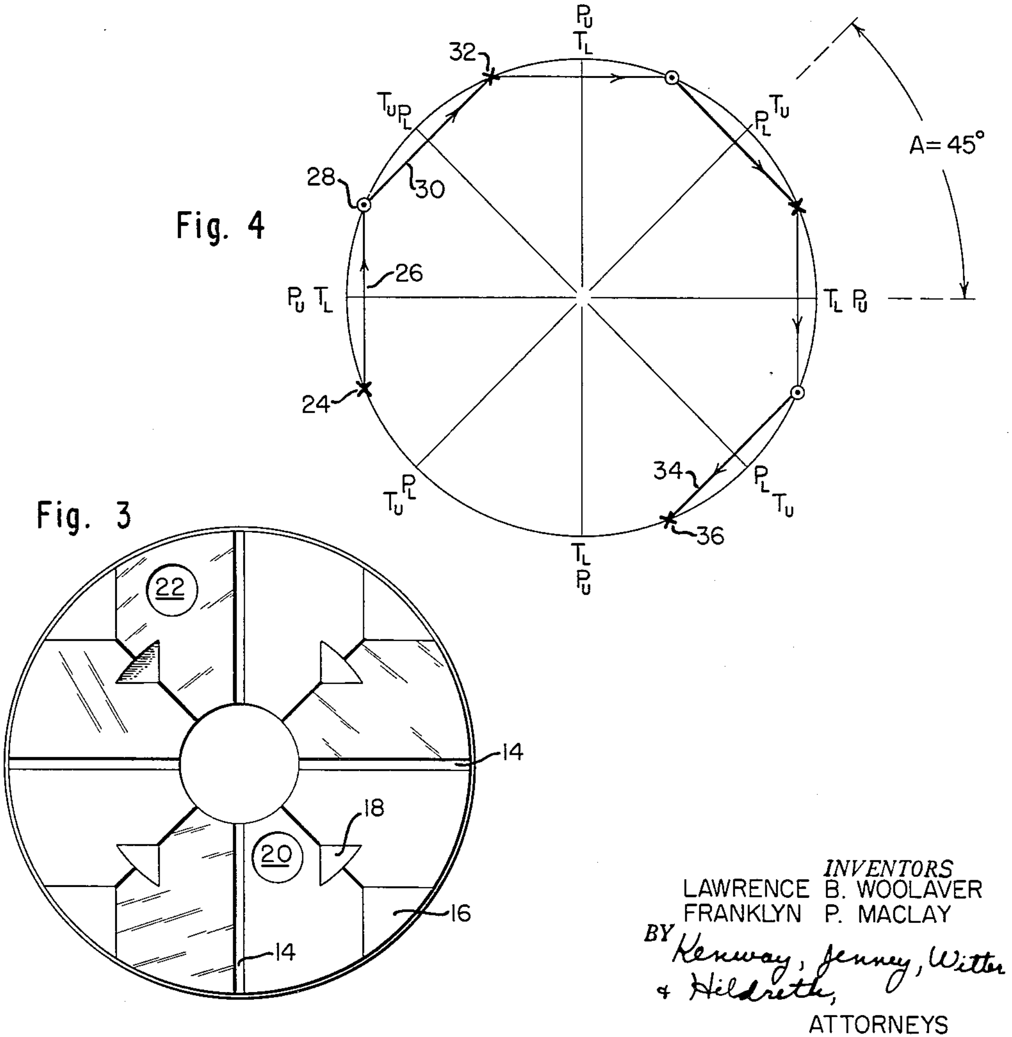

In the drawings Fig. 1 is a longitudinal elevation partly in section of a delay line according to the invention; Fig. 2 is a view in perspective of a reflector; Fig. 3 is a projection of a reflector on a plane at right angles to the axis of the delay line; and Fig. 4 is a diagram illustrating the operation of the apparatus.

Turning first to Fig. 1, the body of the illustrated embodiment consists of a metallic cylindrical shaped piece 2, shown partly in section. At each end of the body is secured an end plate 4, by means of bolts 6. Also secured to each end plate is a corner reflector 8, the construction of which is hereinafter more fully described. The corner reflectors are fastened to the end plate by means of threaded screws 10. It will be noted from the drawing that the end plates provide a seal for the body, and the mercury, which is loaded into the delay line through an opening 12, is continuous between the adjacent surfaces of the body and the corner reflector.

The body 2, instead of being hollow as in the above-described patent, is solid except for a number of concentrically arranged holes such as 13 extending parallel to each other through the length of the body. Thus, when the mercury is loaded it fills each of the holes and also the void spaces between the corner reflector and the body as shown in the figure.

Fig. 2 shows one of the corner reflectors of the embodiment of Fig. 1 in perspective. A projection of the reflector is shown in Fig. 3. It will be noted that, instead of having only one pair of mutually perpendicular reflecting surfaces, there are two such pairs of surfaces, the axis defined by the intersection of each pair being perpendicular to that of the other pair. As will become evident from the description of the operation, the region of each of the reflecting surfaces closely adjacent to these axes is not employed. Therefore, it is convenient to provide brooves 14, thus avoiding the necessity for machining a corner to the same precision as the surfaces.

As hereinafter noted, it is desirable to reduce as much as possible the distance from the ends of the holes in the body to the reflecting surfaces. In order to permit this arrangement, the four points resulting from the machining of the two perpendicular cuts are removed, thus producing flat surfaces 16. Also, a circular cut concentric with the main axis of the body is taken at the intersection of adjacent reflecting surfaces, as shown at 18.

The illustrated embodiment of the invention provides for two separate delay paths. Accordingly, four separate transducers are mounted in the end plates of the delay line, preferably two at each end. Referring to Figs. 1 and 3, a transducer 22 is in the outer sonic path, and a transducer 20 is in the inner sonic path. As explained in the above-mentioned patent, each of the sonic paths has longitudinal segments lying in a cylindrical figure concentric with the axis of the delay line.

The operation of the apparatus will now be described.

Turning to Fig. 4, an end view of the delay line is diagrammatically represented. The lines intersecting in the axis depict the peaks (denoted by P) and troughs (denoted by T) of the reflectors at either end. The reflectors are shown as being in a 45° angular relationship. The diagram is best understood by assuming that the observer is viewing one end plate directly behind the other. The nearer end plate is referred to as the upper one (Subscript U), and the further end plate as the lower one (Subscript L). Thus, for the angular relationship shown a peak of the upper reflector is directly in front of a trough of the lower reflector.

It is further assumed that the center of each of the transducers is located midway between the lines representing the peak and the trough of the reflecting surface in which it is located. The diagram shows only one sonic path from input to output transducers. However, it will be understood that the path for any concentric sonic beam will be symmetrical with that shown.

Assuming that the input transducer is in the upper reflector at 24, the sonic beam will be transmitted downward (perpendicular to the surface of the drawing) until it strikes the reflecting surface of the lower reflector, after which it is reflected over a path 26 to the mutually perpendicular surface of the lower reflector, and thence back to the upper reflector at a point 28. The beam is reflected over a path 30 by the upper reflector to a point 32, where it is again reflected down to the lower reflector. The path continues in this fashion until the beam travels over the path 34, and is deflected to the lower reflector at a point 36. In the described embodiment the output transducer is located at this point in the lower reflector. It will be noted that this leaves an unused segment of the line, including one reflecting surface for each of the reflectors. The reason for leaving this open space relates to the necessity for providing means for compensating for changes in the volume of the mercury with temperature. The holes in the body 2, arranged concentrically in the same manner as the points 24, 28, 32, etc., are all in use, except for the one corresponding to the omitted reflecting surfaces. In this hole an inflated rubber bag accommodating changes in the volume of mercury due to expansion and contraction under changes of temperature is inserted. The construction and use of such devices is well known to those familiar with this art.

From the foregoing description it will be evident that the reflecting surfaces forming pairs in the reflector must be mutually perpendicular; otherwise, the segments of the transmitted beam between reflectors will not remain parallel to the axis of the delay line. It is also evident that the construction heretofore defined requires that the holes and reflecting surfaces be so arranged that the sonic beam always goes through the center of a hole. However, it is obvious that, by changing the angular relationship of the reflectors, it is possible to select, within limits, the number of holes through which the beam travels from input to output transducers. In the illustrated embodiment, it is possible to use one, three, five or seven holes. It will be evident that if the input and output transducers are mounted alternatively in the same reflector, the even numbers of holes can be made available.

It is evident that a construction consistent with the foregoing principles might include more than two pairs of mutually perpendicular reflecting surfaces in each reflector. This, of course, will have a direct effect upon the number of holes in the body 2 which must be employed, as will be evident from the drawings.

From the foregoing description, it will be seen that spurious reflections between segments of the same delay path are virtually eliminated through the combination of confining the beams within the tubes, except for the segments thereof at the ends, and an arrangement of the delay path itself which causes it to progress continuously in the same direction around the circumference of a circle having its center in the axis of the delay line.

The described arrangement of the delay path also eliminates end segments thereof passing near the axis of the delay line, thus permitting insertion of one or more additional concentric delay paths.

The relationship of the shape of the body of the delay line to the shape of each of the reflectors is such as to accomplish the two-fold purpose of bringing the ends of the holes into close proximity with the reflecting surfaces and isolating the two delay paths. This reduces spurious reflections between the separate paths.

As heretofore noted, the delay may be varied by discrete amounts. The number of possible delays which may be incorporated into one delay line is a function of the number of pairs of reflecting surfaces in each reflector and also of various other factors including the number of holes in the body of the delay line and the arrangements for accommodating auxiliary parts such as the inflated bag for compensating for changes in mercury volume with temperature.

As heretofore mentioned, the time delay for each path through the line is the same as that for each of the concentric paths. It will be noted from the drawings that the longitudinal segments are longer for the paths nearer to the axis of the delay line. However, the length of the reflected segments of the path at the ends of the device is shorter for the paths nearer the axis. Thus, the indicated length differences compensate for one another, so that the inner and outer paths are of equal total length.

Having thus described our invention, we claim:

1. A sonic delay line comprising a body having a number of parallel, concentrically arranged, fluid filled holes, two corner reflectors, one at each end of the body, each reflector having a number of pairs of mutually perpendicular plane reflecting surfaces, electro-acoustical input transducers mounted in the reflecting surfaces to generate sonic rays and direct each of them against one of the reflectors to cause the rays to follow multiple paths through the liquid, and output transducers mounted in the reflecting surfaces to receive the reflected sonic energy and convert it into electrical energy, the reflectors being relatively adjustable to change the number of said holes through which the sonic rays must travel from input to output transducers, whereby the length of each sonic ray is adjustable in discrete steps.

2. A sonic delay line comprising a body having a number of parallel, fluid filled holes, arranged in two concentric circles, two corner reflectors, one at each end of the body, each reflector having a number of pairs of mutually perpendicular plane reflecting surfaces, two electro-acoustical input transducers to generate two sonic rays and direct each of them against one of the reflectors to cause the rays to follow multiple paths through the liquid, and two output transducers to receive the reflected sonic energy and convert it into electrical energy, the reflectors being relatively adjustable to change the number of said holes through which the sonic rays must travel from input to output transducers, whereby the length of each sonic ray is adjustable in discrete steps.

3. A sonic delay line having the combination of an elongated body and two corner reflectors arranged at the ends of the body, the body having a number of fluid-filled holes concentrically arranged and parallel to its main axis, each reflector having a number of pairs of mutually perpendicular plane reflecting surfaces, electro-acoustical transducers mounted in the reflectors to convert energy between electrical and sonic forms, means for holding the reflectors in close proximity to the ends of the body, sealing means for retaining the fluid between the body and reflectors to provide a continuous sonic path, and means for adjusting the relative positions of the reflectors to vary the length of the sonic rays between the transducers.

4. A sonic delay line comprising a body having a number of parallel, concentrically arranged, fluid filled holes, two corner reflectors, one at each end of the body, each reflector having two pairs of mutually perpendicular plane reflecting surfaces, the axis defined by the intersection of each pair being at right angles to the axis defined by the intersection of the other pair, electro-acoustical input transducers mounted in the reflecting surfaces to generate sonic rays and direct each of them against one of the reflectors to cause the rays to follow multiple paths through the liquid, and output transducers mounted in the reflecting surfaces to receive the reflected sonic energy and convert it into electrical energy, the reflectors being relatively adjustable to change the number of said holes through which the sonic rays must travel from input to output transducers, whereby the length of each sonic ray is adjustable in discrete steps.

5. A sonic delay line comprising a body having a number of parallel, fluid-filled holes, arranged in two concentric circles, two corner reflectors, one at each end of the body, each reflector having two pairs of mutually perpendicular plane reflecting surfaces, the axis defined by the intersection of each pair being at right angles to the axis defined by the intersection of the other pair, two electro-acoustical input transducers to generate two sonic rays and direct each of them against one of the reflectors to cause the rays to follow multiple paths through the liquid, and two output transducers to receive the reflected sonic energy and convert it into electrical energy, the reflectors being relatively adjustable to change the number of said holes through which the sonic rays must travel from input to output transducers, whereby the length of each sonic ray is adjustable in discrete steps.

6. A sonic delay line having the combination of an elongated body and two corner reflectors arranged at the ends of the body, the body having a number of fluid-filled holes concentrically arranged and parallel to its main axis, each reflector having two pairs of mutually perpendicular plane reflecting surfaces, the axis defined by the intersection of each pair being at right angles to the axis defined by the intersection of the other pair, electro-acoustical transducers mounted in the reflectors to convert energy between electrical and sonic forms, means for holding the reflectors in close proximity to the ends of the body, sealing means for retaining the fluid between the body and reflectors to provide a continuous sonic path and means for adjusting the relative positions of the reflectors to vary the length of the sonic rays between the transducers.

7. A sonic delay line having the combination of an elongated body and two corner reflectors arranged at the ends of the body, the body having a number of fluid-filled holes oriented parallel to its main axis and arranged in two concentric circles, each reflector having a number of pairs of mutually perpendicular plane reflecting surfaces, electro-acoustical transducers mounted in the reflectors to convert energy between electrical and sonic forms, means for holding the reflectors in close proximity to the ends of the body, sealing means for retaining the fluid between the body and reflectors to provide a continuous sonic path, and means for adjusting the relative positions of the reflectors to vary the length of the sonic rays between the transducers, whereby there are provided two sonic delay paths of equal aggregate length, one to occupy each circle of holes in the body.

8. A sonic delay line comprising, a longitudinal body terminated by a pair of reflector structures, said structures each being formed with a like plurality of inwardly facing pairs of mutually perpendicular plane reflecting surfaces having linear intersections uniformly separated in angle, said reflector structures being relatively angularly displaced half the angle separating adjacent reflecting surface pairs.

9. A sonic delay line comprising, a body formed with a plurality of longitudinal parallel cylindrical openings circularly disposed about the delay line axis, said body being enclosed between a pair of reflector structures, said reflector structures each being formed with an equal number of inwardly facing and angularly spaced intersecting pairs of mutually perpendicular plane reflecting surfaces, said reflector structures being relatively angularly displaced half the angle separating adjacent reflecting surface pairs, and input and output transducers for directing sonic energy into and receiving sonic energy from said openings through said reflector structures.

10. Apparatus as in claim 9 wherein said parallel cylindrical openings are arranged in a plurality of concentric circles.

11. A sonic delay line comprising, a body having a number of parallel, fluid filled holes, arranged in two concentric circles, two corner reflectors, one at each end of the body, each reflector having a number of pairs of mutually perpendicular plane reflecting surfaces, two electro-acoustical input transducers to generate two sonic rays and direct each of them against one of the reflectors to cause the rays to follow multiple paths through the liquid, and two output transducers to receive the reflected sonic energy and convert it into electrical energy.

References Cited in the file of this patent

UNITED STATES PATENTS

| | | |
|---|---|---|
| 385,270 | Jacobs | June 26, 1888 |
| 2,055,298 | Leray | Sept. 22, 1936 |
| 2,505,364 | McSkimin | Apr. 25, 1950 |
| 2,558,012 | Star | June 26, 1951 |
| 2,626,992 | Holman | Jan. 27, 1953 |